Patented Dec. 19, 1944

2,365,506

UNITED STATES PATENT OFFICE 2,365,506

POLYMERIZATION OF VINYL COMPOUNDS

Claude H. Alexander, Cuyahoga Falls, and Frank K. Schoenfeld, Silver Lake, Ohio, assignors to The B. F. Goodrich Company, New York, N. Y., a corporation of New York No Drawing. Application January 27, 1941, Serial No. 376,179

9 Claims. (Cl. 260—88)

This invention relates to an improvement in the method of polymerization of vinyl chloride, vinylidene chloride, and mixtures of these monomers with each other and with minor proportions of other ethylenic monomers, that is, the polymerization of any ethylenic monomer which liberates hydrochloric acid during polymerization. It has as its principal object to provide polymers which have improved dielectric properties when used in compositions with a plasticizer.

It is well known that these materials may be polymerized when emulsified in water in the presence of a peroxygen catalyst, such as hydrogen peroxide, sodium perborate, or an organic peroxide. However, it has heretofore been necessary to carry out the reaction in the absence of iron and steel. Enamel-lined or lead-lined equipment has been preferred, although several other materials have been used, either alone or as linings applied to iron and steel vessels. Ferrous metals have been avoided for three main reasons: first, in that the most satisfactory product is obtained when the reaction is carried out in an acid medium, a large part of the acid being hydrochloric acid liberated during the reaction, which attacks and corrodes any iron or steel present; second, in that the product tends to agglomerate on the walls of the container, building up to a thick rind which is extremely difficult to remove, and which renders control of the temperature of the reaction difficult; third, in that the iron dissolved in the acidic aqueous medium during the course of the reaction is absorbed on the product and is extremely difficult to remove by washing. The presence of these iron salts is undesirable because they not only discolor the polymer but also decrease its heat stability and the electrical resistivity of compositions made from it.

All but one of these objections to iron and steel vessels may be eliminated by carrying out the polymerization in the presence of a small amount of a buffer salt as for example the alkali metal salts of weak acids, e. g. sodium meta silicate, disodium phosphate, sodium bicarbonate, or potassium bicarbonate, and by means or these salts keeping the pH of the aqueous solution between 4.0 and 9.0. In practice it is found that a stainless steel, of the usual 18–8 type, is most satisfactory for aqueous emulsions, although any steel which is resistant to weak acids and to oxidizing agents will serve.

However, the presence of salts of this class in the reaction mixture is very undesirable because of their adsorption on the product to give a polymer of low electrical resistivity when compounded with the ordinary plasticizers. Their removal from the polymer by washing is extremely difficult and increases greatly the cost of the product.

Although the dielectric properties of compositions made from polymers such as these are of no consequence for many of the uses to which they are put, the resistivity is important when the composition is to be used as an electrical insulator.

Our invention lies in the discovery that a lead salt of a monocarboxylic acid such as lead formate, lead acetate, lead propionate, lead butyrate, etc., when dissolved in the reaction mixture not only has a desirable buffering action but also yields a product which without washing will have a resistivity, when compounded in a standard test composition, equivalent to the resistivity of a similar polymer prepared with sodium bicarbonate as a buffer after five to ten washings.

There must be a sufficient quantity of the lead salt present to obtain the desired buffering effect, but any excess, while unnecessary, is not harmful. Nevertheless the resistivity of our improved product, regardless of the amount of lead salt used, may be still further increased by washing. Moreover, a solution of a salt of this class permits the use of a reactor made of a ferrous metal by eliminating corrosion of the vessel, adherence of the polymer to the surface of the vessel, and contamination of the product with iron salts provided that the solution is such that the pH remains above 4.0 throughout the reaction. The preferred concentration of our new buffers is about 0.1% to 5.0% or more on the water.

We have obtained good results by polymerizing in the presence of a salt of a strong acid and a metal which forms a substantially insoluble chloride; indeed, washing the polymer after completion of the reaction with a solution of a salt the cation of which forms an insoluble chloride, as for example silver nitrate, will give improved electrical properties; nevertheless, the preferred form of our invention embodies polymerization in the presence of a lead salt of a monocarboxylic acid.

In the case of polymers in the aforesaid class made in glass, or in reactors lined with some acid-resistant material, either with or without an ordinary buffer salt, it is found likewise that the addition of our new buffer salt to the reaction mixture gives a product with greatly improved electrical properties.

Our buffers may be used with any of the ordinary catalysts of polymerization, and with any emulsifying agent which does not react with lead salts to give an insoluble product.

The following examples, in which the units are parts by weight, are given to illustrate our invention:

*Example 1*

|  | A | B |
|---|---|---|
| Vinyl chloride | 100 | 100 |
| Caprylyl peroxide | 0.15 | 0.15 |
| Gelatin | 0.19 | 0.19 |
| Water | 187.5 | 187.5 |
| Sodium bicarbonate | 0.0 | 0.19 |
| Lead acetate | 0.94 | 0.0 |

These mixtures are heated in an autoclave at 40° C. for 65 hours with stirring. The polymers so produced, after washing by decantation as indicated below, are compounded in the proportions of 100 parts by weight of polymer to 62.5 parts of tricresyl phosphate and 5 parts of lead oxide; the specific resistivities of sheets molded from this composition at 297° F. are given below in ohms $\times 10^9$ per cubic centimeter at 70° C.

|  | A | B |
|---|---|---|
| Unwashed polymer | 112 | 6.4 |
| One washing (tap water) | 125 | ---- |
| Three additional washings (distilled water) | 146 | 31 |
| Six additional washings (distilled water) | 173 | 36 |

*Example 2*

|  | C | D |
|---|---|---|
| Vinyl (a) chloride | 45 | 45 |
| Vinylidene chloride | 5 | 5 |
| Caprylyl peroxide | 0.075 | 0.075 |
| Gelatin | 0.188 | 0.188 |
| Sodium bicarbonate | 0.0 | 0.188 |
| Lead acetate | 0.423 | 0.0 |
| Water | 75.0 | 75.0 |

These mixtures are heated in an autoclave at 40° C. for 71 hours. The polymers produced are washed by suspending in distilled water at 60° C. in the proportion of one part of polymer to about eight parts of water and stirring for thirty minutes. After filtering and drying, the product is compounded and tested as in Example 1. The polymer made from C has a resistivity of $96 \times 10^9$ ohms per cubic centimeter at 70° C., that made from D, $26 \times 10^9$ ohms per cubic centimeter at 70° C.

(b) Vinyl acetate is substituted for the vinylidene chloride used in (2). The resulting copolymers have resistivities, respectively of 58 and 22 ohms $\times 10^9$ per cubic centimeter at 70° C.

Although we have herein disclosed specific examples of our invention, we do not intend to limit ourselves solely thereto, but only as indicated by the appended claims.

We claim:

1. In the process of polymerizing a chlorine-substituted ethylene in which chlorine is attached to one only of the carbon atoms in an aqueous emulsion with a peroxygen catalyst, the step which comprises carrying out the reaction in the presence of a water-soluble lead salt of a saturated fatty acid.

2. In the process of polymerizing a chlorine-substituted ethylene in which chlorine is attached to one only of the carbon atoms in an aqueous emulsion with a peroxygen catalyst, the step which comprises carrying out the reaction in a ferrometallic reactor in the presence of a water-soluble lead salt of a saturated fatty acid.

3. In the process of polymerizing a chlorine-substituted ethylene in which chlorine is attached to one only of the carbon atoms in an aqueous emulsion with a peroxygen catalyst, the step which comprises carrying out the reaction in a ferrometallic reactor in the presence of a water-soluble lead salt of a saturated fatty acid as the sole metallic salt present.

4. In the process of polymerizing a chlorine-substituted ethylene in which chlorine is attached to one only of the carbon atoms in an aqueous emulsion with a peroxygen catalyst, the step which comprises carrying out the reaction in the presence of lead acetate.

5. In the process of polymerizing a chlorine-substituted ethylene in which chlorine is attached to one only of the carbon atoms in an aqueous emulsion with a peroxygen catalyst, the step which comprises carrying out the reaction in a ferrometallic reactor in the presence of lead acetate.

6. In the process of polymerizing vinyl chloride in an aqueous emulsion with a peroxygen catalyst, the step which comprises carrying out the reaction in the presence of a water-soluble lead salt of a saturated fatty acid.

7. In the process of polymerizing vinyl chloride in an aqueous emulsion with a peroxygen catalyst, the step which comprises carrying out the reaction in the presence of lead acetate.

8. In the process of polymerizing vinyl chloride in an aqueous emulsion with a peroxygen catalyst, the step which comprises carrying out the reaction in a ferrometallic reactor in the presence of a water-soluble lead salt of a saturated fatty acid.

9. In the process of polymerizing vinyl chloride in an aqueous emulsion with a peroxygen catalyst, the step which comprises carrying out the reaction in a ferrometallic reactor in the presence of lead acetate.

FRANK K. SCHOENFELD.
CLAUDE H. ALEXANDER.